UNITED STATES PATENT OFFICE.

JOHN P. MINNE, OF COSMOPOLIS, WASHINGTON.

COMPOUND FOR TREATMENT OF SMUT.

1,375,529.   Specification of Letters Patent.   Patented Apr. 19, 1921.

No Drawing.   Application filed November 24, 1919. Serial No. 340,222.

*To all whom it may concern:*

Be it known that I, JOHN P. MINNE, a citizen of the United States, residing at Cosmopolis, in the county of Grays Harbor and State of Washington, have invented certain new and useful Improvements in Compounds for Treatment of Smut, of which the following is a specification.

This invention relates to improvements in compounds for the treatment of cereals to prevent smut.

The primary object of the invention is to provide a compound for treating kernels for preventing infection of the kernels with a parasitic fungi which produces a disease termed smut. The smut spores affecting the grain kernels remain dormant in the kernel furrows until the grains germinate, and then the hyphæ rapidly consume the seed endosperm leaving in its place the mass of black spores known as smut. The present invention is designed to positively prevent this disease without injuring the kernels to prevent their ultimate sprouting.

The constituents of the compound are as follows:

Two gallons of water
Three pounds of lime
One-half pound of salt
Two pounds of ashes.

In the preparation of the composition the ingredients are boiled in the proper quantity of water and are stirred until the temperature of the boiling water falls to a sufficient degree to permit treatment of the grain kernels therewith without possible killing of the kernels, that is rendering the kernels useless for seed purposes.

Heretofore copper sulfate has been used as a fungicide for seeds intended for planting, but the present compound is designed as an improvement over copper sulfate in that the curative effects of the compound continue until the grain kernels are ready for sprouting.

While the above quantities of the constituents of this compound set forth for the treatment for approximately one bushel of the cereal it is understood that with increased quantities of the compound the amount of each of the constituents will be increased accordingly, and such changes in the proportions thereof may be effected when the compound is reduced to practice or commercialized as fall within the spirit and scope of what is claimed.

I claim:

A compound for the treatment of grain to prevent smut comprising three pounds of lime, one-half pound of salt, two pounds of ashes, two gallons of water thoroughly heated and comingled.

In testimony whereof, I affix my signature hereto.

JOHN P. MINNE.